United States Patent
Satanek

(10) Patent No.: US 7,328,411 B2
(45) Date of Patent: Feb. 5, 2008

(54) SCROLLBAR ENHANCEMENT FOR BROWSING DATA

(75) Inventor: Brandon Lynn Satanek, Lexington, KY (US)

(73) Assignee: Lexmark International, Inc., Lexington, KY (US)

(\*) Notice: Subject to any disclaimer, the term of this patent is extended or adjusted under 35 U.S.C. 154(b) by 673 days.

(21) Appl. No.: 10/804,630

(22) Filed: Mar. 19, 2004

(65) Prior Publication Data

US 2005/0210403 A1 Sep. 22, 2005

(51) Int. Cl.
*G06F 3/048* (2006.01)

(52) U.S. Cl. .............................. 715/786; 715/787

(58) Field of Classification Search ............... 715/784, 715/786, 787
See application file for complete search history.

(56) References Cited

U.S. PATENT DOCUMENTS

| | | | |
|---|---|---|---|
| 5,040,131 A * | 8/1991 | Torres ..................... 715/810 |
| 5,414,811 A | 5/1995 | Parulski et al. |
| 5,485,553 A | 1/1996 | Kovalick et al. |
| 5,510,808 A * | 4/1996 | Cina et al. ................. 345/684 |
| 5,739,817 A * | 4/1998 | Glei et al. ................. 715/787 |
| 5,872,566 A * | 2/1999 | Bates et al. ............... 715/786 |
| 5,874,961 A * | 2/1999 | Bates et al. ............... 715/786 |
| 6,123,362 A | 9/2000 | Squilla et al. |
| 6,396,506 B1 | 5/2002 | Hoshino et al. |
| 6,437,058 B2 | 8/2002 | Furihata et al. |
| 6,549,306 B2 | 4/2003 | Fredluand et al. |
| 6,606,398 B2 | 8/2003 | Cooper |
| 6,229,104 B1 | 9/2003 | Parulski et al. |
| 6,629,104 B1 | 9/2003 | Parulski et al. |
| 6,631,011 B2 | 10/2003 | Fredlund et al. |
| 6,738,787 B2 * | 5/2004 | Stead ....................... 707/104.1 |
| 6,771,284 B1 * | 8/2004 | Anderson et al. ........... 715/705 |
| 6,778,192 B2 * | 8/2004 | Arbab et al. ................ 715/786 |
| 6,828,989 B2 * | 12/2004 | Cortright ................... 715/769 |
| 7,071,934 B1 * | 7/2006 | Faoro et al. ............... 715/513 |
| 7,114,129 B2 * | 9/2006 | Awada et al. ............... 715/786 |
| 2002/0167683 A1 | 11/2002 | Hanamoto et al. |
| 2002/0186251 A1 * | 12/2002 | Himmel et al. ............. 345/784 |
| 2002/0186252 A1 * | 12/2002 | Himmel et al. ............. 345/787 |

(Continued)

OTHER PUBLICATIONS

Disclosed Anonymously, "Visual scaling technique for scrolling bars", Jan. 1989, Research Disclosure Database No. 297050.*

*Primary Examiner*—Ba Huynh
*Assistant Examiner*—Sara Hanne
(74) *Attorney, Agent, or Firm*—Taylor & Aust, P.C.

(57) ABSTRACT

A graphical user interface for browsing information displayed to a user. The information displayed includes zero or more elements and may be displayed in a display window. The display window has a perimeter and a scrollbar is positioned along the perimeter. The scrollbar may have a first end and a second end and a slider located between the ends. The slider may be configured such that movement of the slider causes information in the display area to be scrolled. In one embodiment, the size of the slider is based on the size of the one more elements of information displayed in the display window. A data-line may be positioned adjacent the scrollbar and may have a plurality of tick marks. A graphical element, which may be displayed in phantom, may be used to associate the slider to the data-line.

33 Claims, 6 Drawing Sheets

U.S. PATENT DOCUMENTS

2003/0160824 A1    8/2003  Szumla
2004/0021694 A1*   2/2004  Doar ......................... 345/784
2005/0091604 A1*   4/2005  Davis ......................... 715/772

* cited by examiner

FIG. 5

SCROLLBAR ENHANCEMENT FOR BROWSING DATA

BACKGROUND OF THE INVENTION

The present invention relates to managing data, and more particularly to methods and systems for managing images and files with a graphical user interface ("GUI") having a scrollbar.

It is well known that digital systems have replaced and continue to replace analog systems. For example, it is predicted by some that digital cameras will replace or nearly replace film cameras by 2008. As the growth and usage of digital cameras and other digital, data-acquisition systems has exploded, so too has the number of files and digital images produced. For example, a digital camera user may have thousands of photographs on his or her computer due to the ease of taking multiple pictures and transferring them.

The large volume of digital images presents problems for users; as it is often difficult to organize and manage such a large number of photographs and to find specific photographs after they are taken.

Some manufacturers of software have produced a timeline GUI to assist users in organizing photographs. In general, timeline GUIs take the form of a histogram of photographs over time that appears like a bar chart. The height of bars or histogram elements corresponds to the number of photographs taken in that particular time frame (usually a month). Also, all the photographs in a user's library are shown at once.

SUMMARY OF THE INVENTION

Although timeline GUIs are an improvement over the general interfaces provided by common software, for example, Microsoft Windows, timeline GUIs are not completely satisfactory.

First, current timeline GUIs are different from most user interfaces and, as a consequence, the users of timeline GUIs must learn how to use a timeline GUI. Many users are too busy or lack the desire or ability to learn a new interface. In addition, for those users that do learn how to use a timeline GUI, they are forced, in practice, to use multiple GUIs: the timeline GUI for gross navigation, and a scrollbar for fine navigation. Because these GUIs must be used separately, navigation is generally slow and confusing. For example, although the timeline GUI provides gross positional information, the user is not made aware of where they are within any particular histogram element.

Accordingly, there is a need for improved methods and systems for organizing, managing, and finding photographs and files stored on a computer.

In one embodiment, the invention provides a graphical user interface for browsing information displayed to a user. The information displayed includes zero or more elements and is displayed in a display window. The display window has a perimeter, and a scrollbar is positioned along the perimeter. The scrollbar has a slider. The slider is configured such that movement of the slider causes information in the display area to be scrolled. In one embodiment, the size of the slider is based on the size of the elements of information displayed in the display window. A data-line is positioned adjacent the scrollbar and has a plurality of tick marks. A graphical element, which may be displayed in phantom, associates the slider to the data-line.

In another embodiment, the invention provides a method of organizing data in a graphical user interface. The method may include providing a display window with a perimeter in the graphical user interface; displaying a set of data in the display window, the set of data having zero of more elements; providing a scrollbar along the perimeter of the display window, and associating a slider with the scrollbar. The scrollbar may be configured such that movement of the slider causes information in the display area to be scrolled. The method may include sizing the slider based on the size of the one or more elements of information; positioning a data-line adjacent the scrollbar, the data-line having a plurality of tick marks; and associating the slider to the data-line with a graphical element.

Other features and advantages of the invention will become apparent to those skilled in the art upon review of the following detailed description, claims, and drawings.

BRIEF DESCRIPTION OF THE DRAWINGS

In the drawings:

FIG. 5 is an illustration of an exemplary GUI useful to find and organize files.

Figure 1:
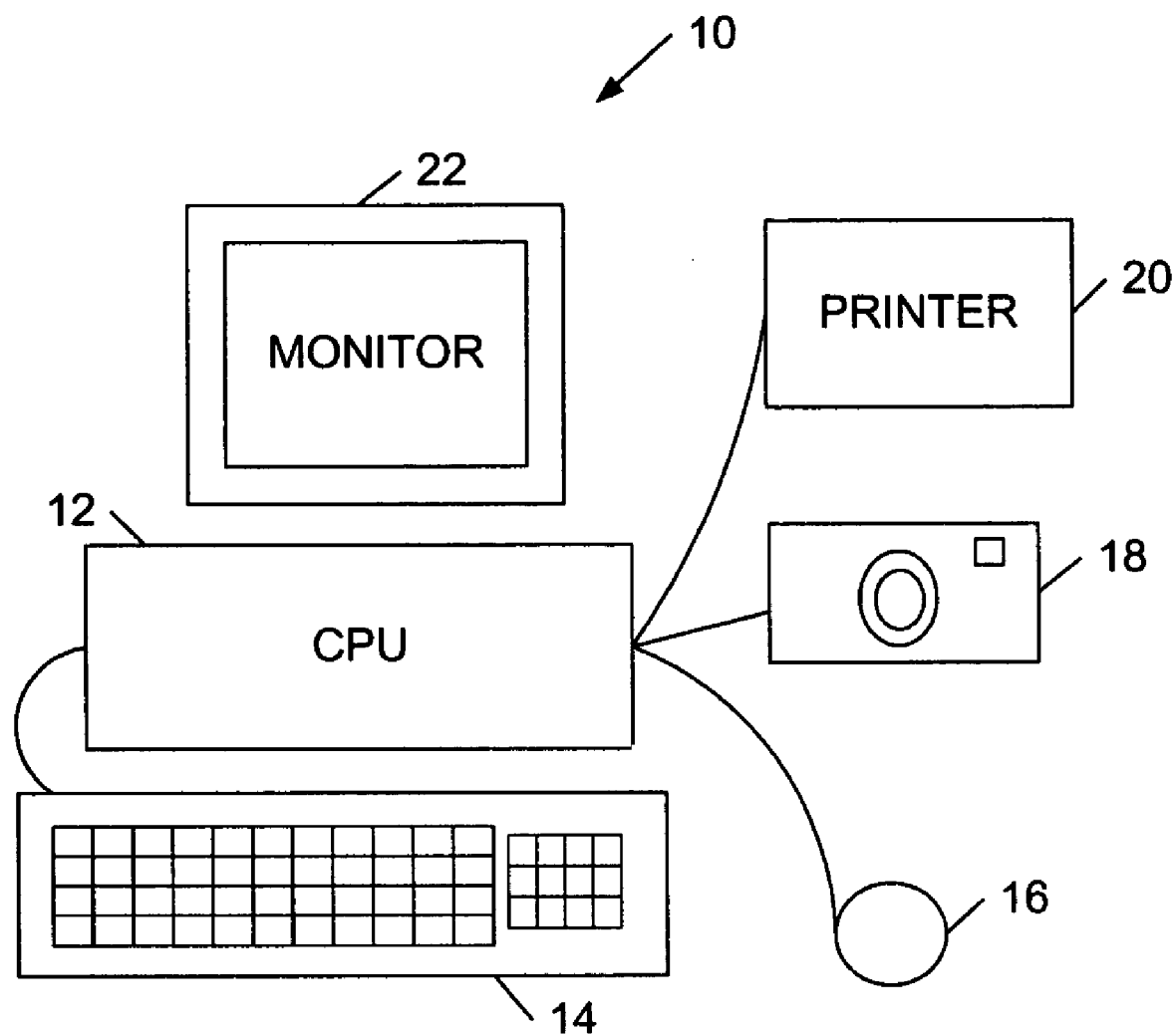
FIG. 1 is an illustration of an exemplary computer system on which software designed in accordance with embodiments of the invention may run.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

FIG. 1 illustrates a computer system 10 having a central processing unit 12 (including, for example, a processor, solid-state memory, and a disk drive (all not shown)), a keyboard 14, a cursor-control device (e.g., a mouse, joystick, etc.) 16, a digital camera 18, a printer 20, and a monitor 22 (which could incorporate a cursor-control device in the form of a touch screen). The computer system 10 may be an implementation of personal computer systems available from manufacturers such as Dell and Apple, but various other computers systems that are capable of supporting a GUI may be used. Software implementing embodiments of the invention may be developed using a variety of commercially available tools. For example, embodiments of the invention may be developed using standard development toolkits for the chosen operating system platform. Possible choices include Microsoft Visual C++ or Visual Basic when implementing a Windows-based embodiment. If a web-based embodiment is desired, Java or Macromedia Flash could be used to create an appropriate embodiment. Generally, the actual coding of any software needed to implement a GUI embodying the invention, once provided the information herein, is within the abilities of persons of ordinary skill in the art.

Additional and various well-known computer peripherals and input/output devices (e.g., video camera, scanner, speakers, microphone, etc.) (not shown) may be used in the system 10. The system 10 may include commonly known operating system software (e.g., Microsoft Windows, Apple OS) and various application software (e.g., word processing software and software to download or transfer images from a digital camera to memory in the central processing). Embodiments of this invention may be implemented as application software designed to be executed by the central processing unit 12 or even as a part of a feature-laden operating system. For example, the software generating the GUI could be integrated with the Microsoft Windows operating system or the Apple operating system.

Figure 2:
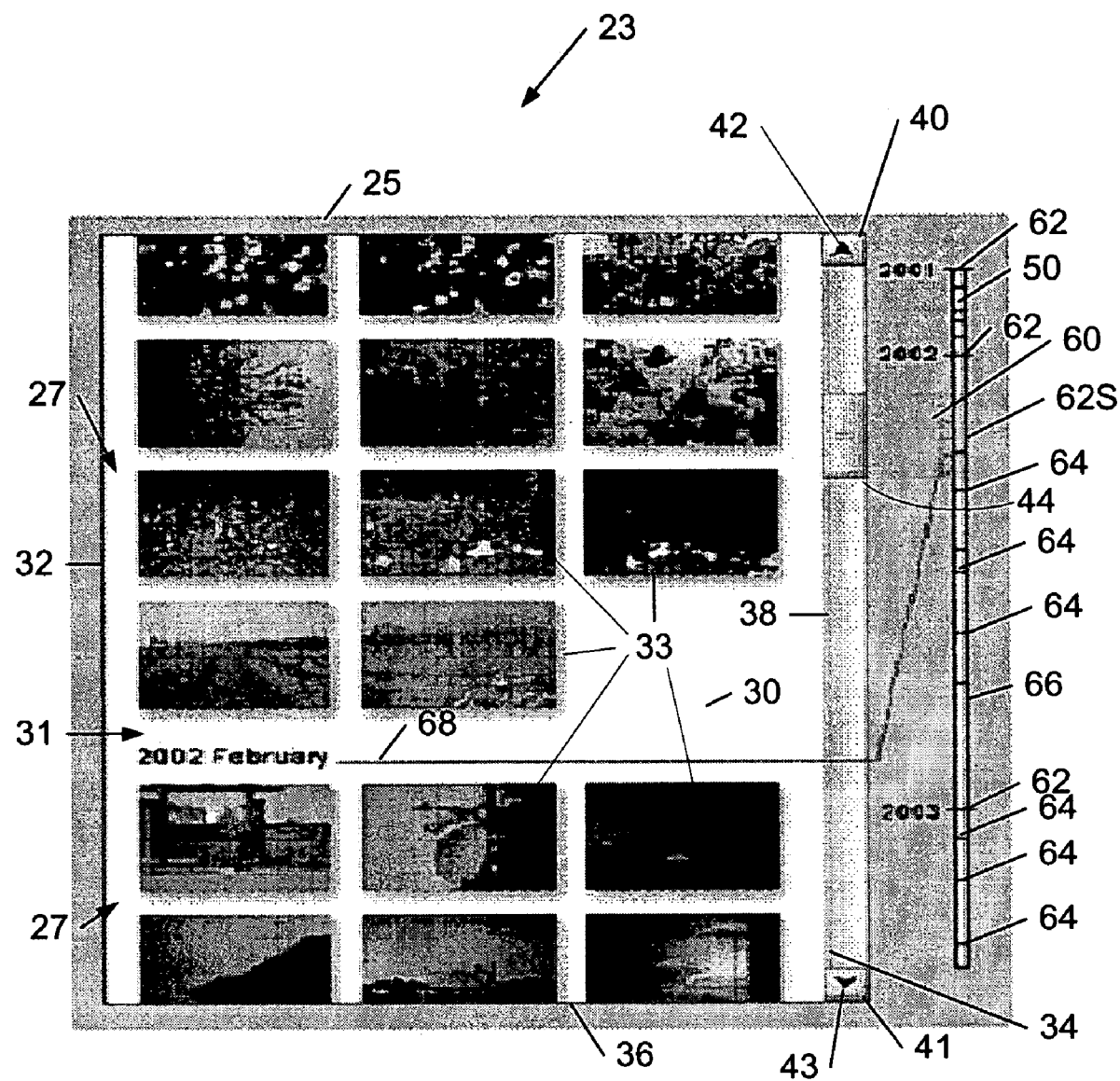
FIG. 2 is an exemplary GUI useful to find and organize images.

FIG. 2 illustrates an exemplary GUI 23 that may be displayed on the monitor 22. The GUI 23 includes a display window 25. Generally, the window 25 displays a set of data 27 in a display area 31. The display area 31 has a perimeter 32. The information or a set of data 27 displayed within the display area 31 may be composed of a variety of elements 33 such as images, files, icons, or the like. In the example shown in FIG. 1, a set of thumbnail images is displayed in the display area 31. When the display window 30 is generated in a rectangular form (as shown), the window includes a vertical edge 34 and a horizontal edge 36. Generally, a scrollbar 38 is positioned along the perimeter 32. In the embodiment shown, the scrollbar 38 is positioned along the vertical edge 34. The scrollbar 38 could be positioned horizontally or in any other convenient orientation.

In the embodiment shown, the scrollbar 38 has a first end 40 and a second end 41, and a slider 44 is positioned between the first and second ends 40 and 41. The scrollbar also has associated arrow buttons 42 and 43. The slider 44 is configured such that movement of the slider causes information in the display area 31 to be scrolled. Generally, the slider 44 may be configured such that its size is based on the size of the one or more elements 33 of information in the display area 31.

Figure 6:
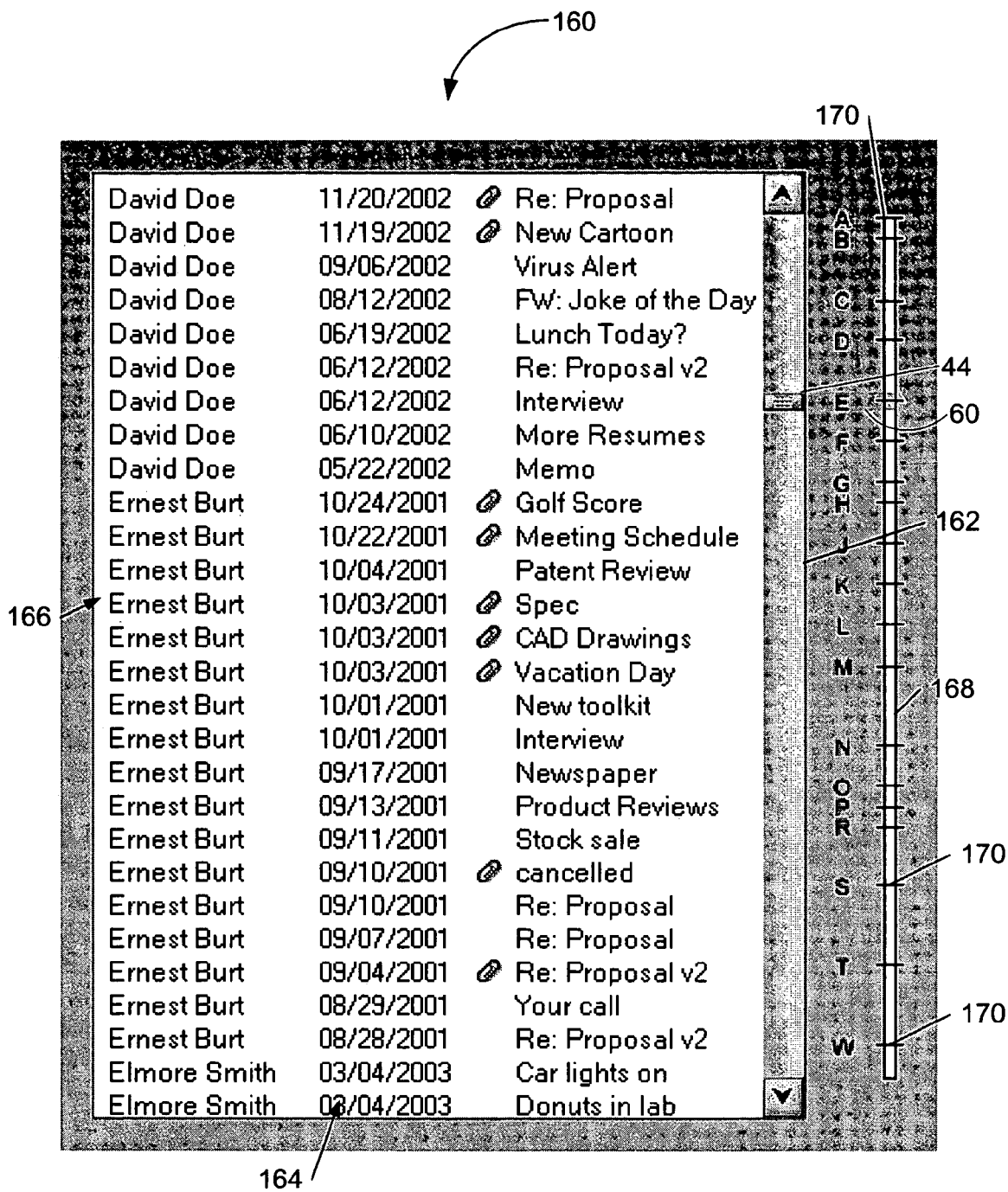
FIG. 6 is an illustration of another exemplary GUI useful to find and organize files.

A data-line 50 may be positioned next to and, in the embodiment shown, runs parallel with the scrollbar 38. The data-line 50 is used to indicate what are referred to herein as "chunks" of data. In the case of browsing photographs by date (shown in FIG. 2), the data-line is a temporally arranged set of years/months. In other embodiments, the data-line may be arranged alphabetically (as shown in FIG. 6), by number (not shown), or by another convenient organization technique or methodology (such as size, Library of Congress designation, category, subject, etc.).

In one embodiment, a marker 60 is associated with the slider 44. The marker 60 is a graphical element. In the embodiment shown, the marker 60 is fixed to the slider 44 such that the marker is always at the same height and vertical position as the slider 44. The marker 60 virtually (in the sense of being a simulation of a physical connection) extends the slider onto the data-line 50. In the embodiment shown, the marker is shown in phantom (and, as a consequence, the user can see items beneath the marker) and provides feedback to a user viewing the display area 51. The feedback is in the form of an indication (the phantom lines overlapping the data-line) of the location of the displayed data elements in the data set being examined. The marker may be distinctively colored to enhance its feedback capabilities.

The data-line 50 may also include major and minor tick marks 62 and 64, respectively. Generally, the tick marks 62 and 64 indicate divisions of groups of data on the data-line 50. In the case of browsing data by date, major tick marks 62 indicate years (labeled, 2001, 2002, and 2003 in FIG. 2). Minor tick marks 64 represent months (and may be optionally labeled depending on the size of the data-line). The space between two tick marks is a chunk of data 66.

As shown in FIG. 2, a separator line or, more broadly, a separator 68 may be used to help visually divide the data being examined into groups that correspond to respective sections on the data-line 50. The separator 68 extends from the tick marks 62 and 64 on the data-line 50 (in this case a tick-mark labeled 62S) through the scrollbar 38, and is anchored in the data displayed in the display area 31. In the exemplary embodiment shown in FIG. 2, the separator 68 marks the beginning of a new month, and is anchored at a fixed point on the data-line 50 (tick-mark 62S) and a moving break point in the data-set (the point that separates two months of data). Due to this arrangement, the separator 58 scrolls automatically as the user scrolls (because data displayed in the display area 31 can be scrolled). Generally, the separator 68 is not visible in the display area, unless the current view of the data spans more than one chunk of data (which in the embodiment shown in FIG. 2 is a month). Multiple lines may be present if more than two chunks are spanned in the view of the data displayed in the display area 31.

In one embodiment of the invention, the data-line 50 and tick marks 62 and 64 are constructed by analyzing the data set and creating meaningful chunks of data 66. In the case of digital photographs, the data-line may be constructed by analyzing JPEG EXIF (EXchangeable Image File) metadata found inside the photographs. (As is known, JPEG Exif provides a mechanism for recording the date a digital photograph is taken as well as other information that describes the photographs taken with a digital camera.) Each chunk 66 can consist of all the photographs taken in that month, and can be sized accordingly. For example, if 50 digital photographs out of an exemplary data set of 500 photographs in a data set are taken in March of a subject year, then the corresponding chunk would take up 10% of the space on the data-line 50. In some embodiments, each month with photographs is given space on the data-line and separated by one tick-mark.

When constructing the data-line 50 from a set of digital image files using EXIF information, the EXIF information may be first read to a catalog when the photographs are taken. Microsoft provides a set of Application Programming Interface's (API's) within the Windows GDI+ (Graphical Device Interface) library that can be used to facilitate the process. For each image file, an API within GDI+ can read the "PropertyTagExifDTOrig" property tag value, which corresponds to the date and time the photo was taken. This information, in turn, may be used to construct the data-line and the tick marks.

Figure 3:
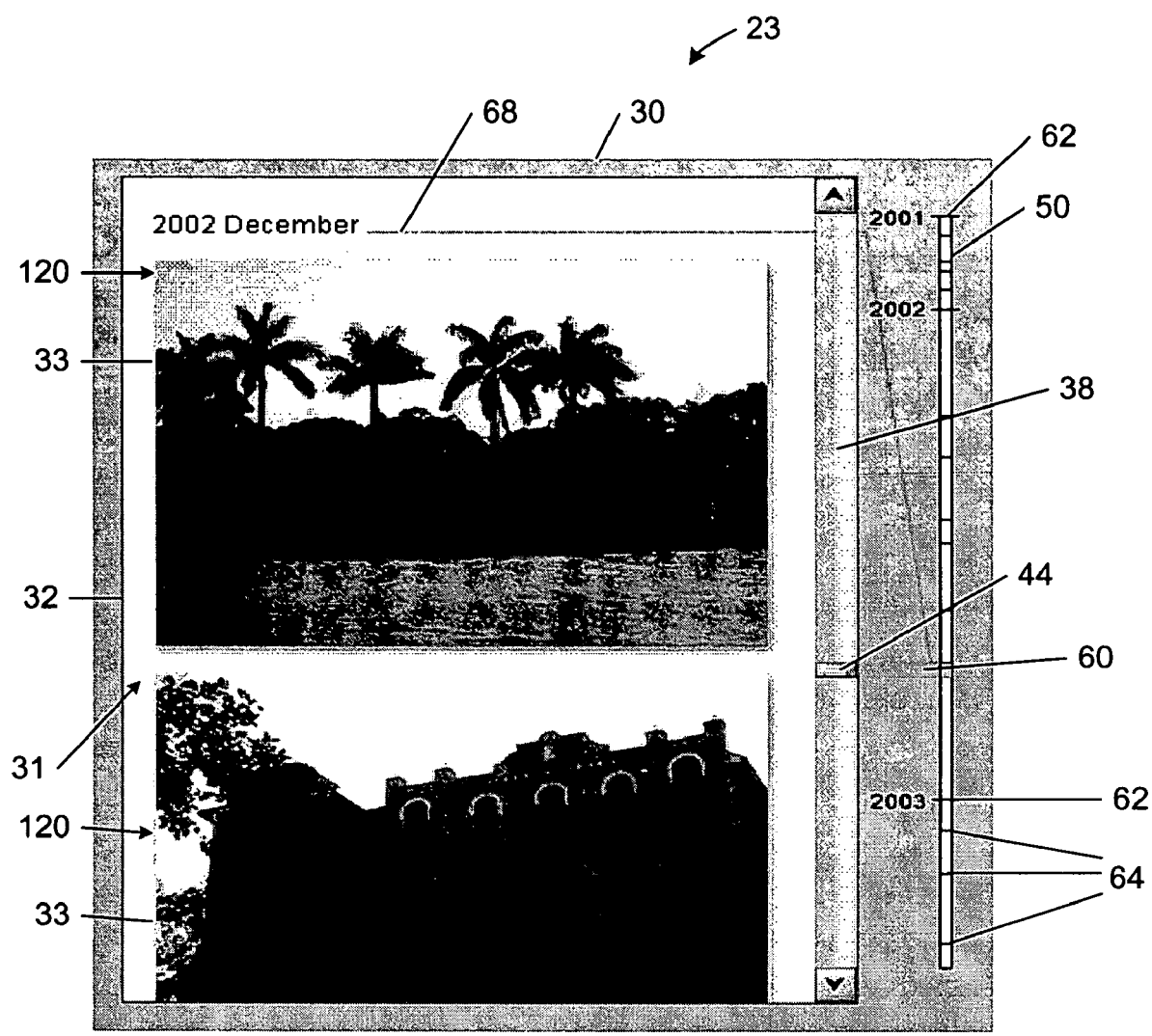
FIG. 3 is an illustration of another exemplary GUI useful to find and organize images.

FIG. 3 illustrates the GUI 23 displaying a second set of data 120. In this case, a set of relatively large photographs, rather than thumbnail images, is displayed. FIG. 3 includes many of the same elements of FIG. 2. Note, however, that the size of the slider 44 and marker 60 have been reduced due to the increase in size of the elements 33.

Figure 4:
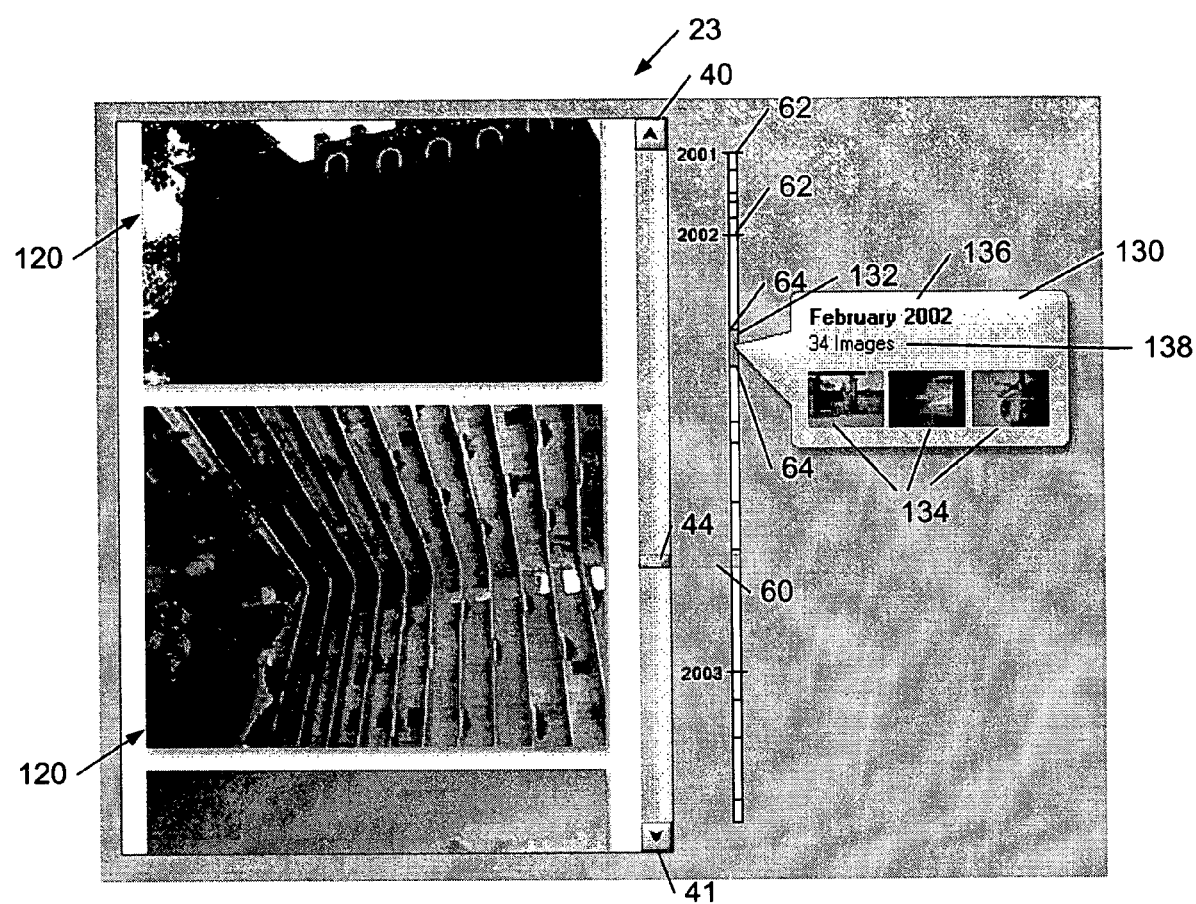
FIG. 4 is an illustration of an exemplary GUI showing a pop-up window containing additional information regarding a selected portion of a data-line.

FIG. 4 illustrates another view of the second set of data 120, scrolled to a new position and where a pop-up window 130 has been displayed in the GUI 23 (such as by moving the cursor control device so that a portion of the data-line is selected by the cursor). The pop-up window 130 is associated with a chuck of data 132 and includes a series of thumbnail images 134 that are included in the chunk of data 64. The pop-up window can provide various information including a date indicia 136 and an indicator 138 of the total number of images in the chunk of data 64.

Figure 5:
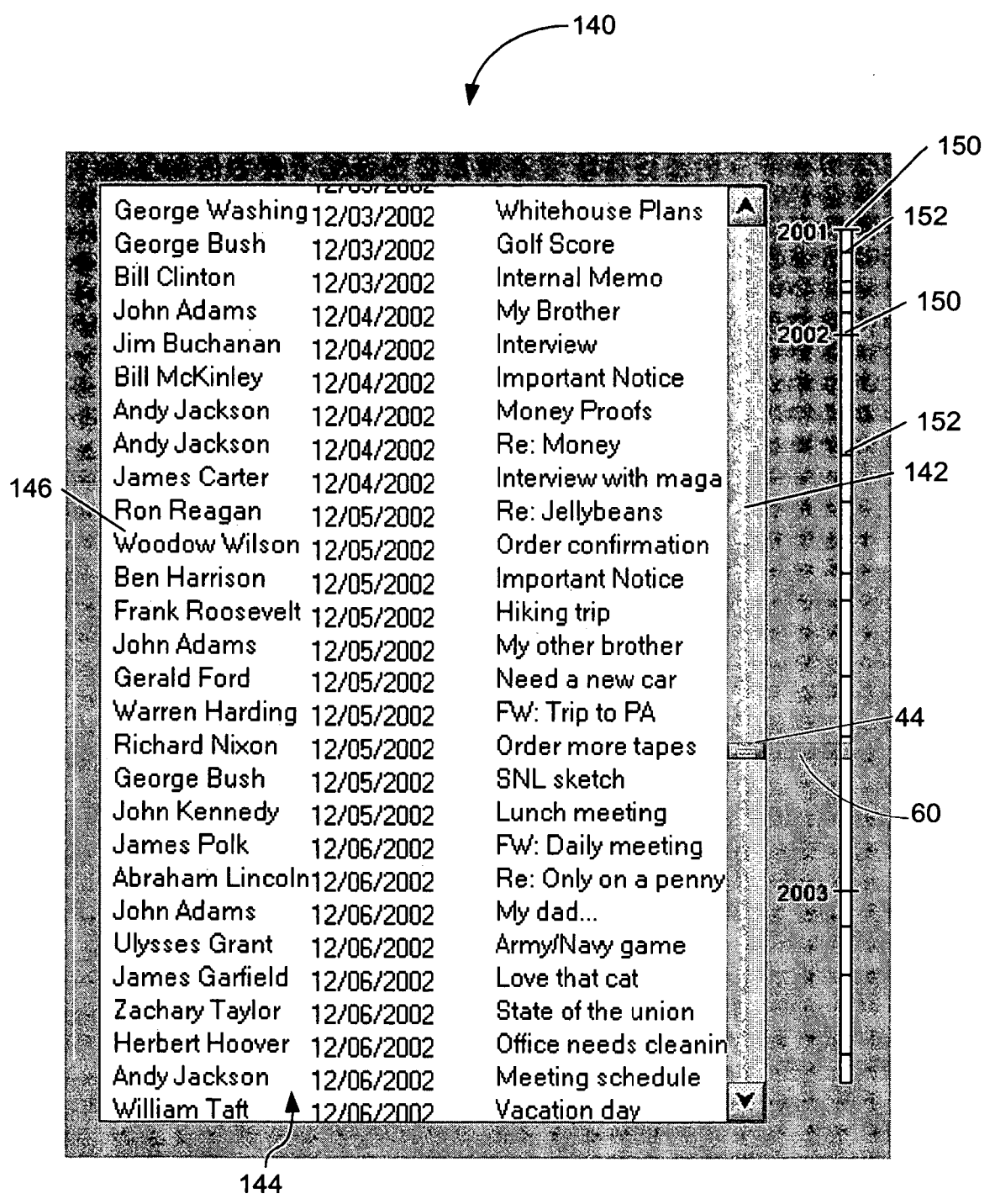

FIGS. 5 and 6 illustrate embodiments of the invention where a third data set, composed of email messages, is arranged according to date and alphabetically by the first name of the sender, respectively. When constructing the data-line from other objects, such as the email messages illustrated in FIGS. 5 and 6, the inherent properties of those objects are used. For example, if the data-line represents an alphabetical list of e-mail recipients, then the header information of each e-mail message could be used to create the data-line and appropriate tick marks.

In particular, FIG. 5 illustrates a GUI 140 having a scrollbar 142 and a display area 144. A data set 146 of email messages arranged by year and month is presented in the display area 144. A data-line 148 has corresponding tick marks 150 and 152. Other features are similar to the embodiments already discussed and, therefore, are not explained in detail.

FIG. 6 illustrates a GUI 160 having a scrollbar 162 and a display area 164. A data set 166 of email messages is arranged alphabetically. A data line 168 has corresponding tick marks 170. Other features are similar to the embodiments already discussed and, therefore, are not explained in detail.

As should be apparent to one of ordinary skill in the art, many of the components and logical structures described are capable of being implemented in software executed by a microprocessor or a similar device or of being implemented in hardware using a variety of components including, for example, application specific integrated circuits ("ASICs"). Thus, the claims should not be limited to any specific hardware or software implementation or combination of software or hardware.

Various features and advantages of the invention are set forth in the following claims.

The invention claimed is:

1. A computer system having a display device and a control device, a graphical user interface for browsing information, including one or more elements, displayed to a user, comprising:
    a display window displayed on the display device having a display area where the one or more elements are displayed;
    a scrollbar positioned within the display window, the scrollbar having a first end and a second end;
    a slider located between the first end and the second end of the scrollbar and configured such that movement of the slider causes information in the display area to be scrolled, the slider having a size that is based on the size of the one more elements of information;
    a data-line positioned parallel to the scrollbar, the data-line having a plurality of tick marks; and
    a graphical element extending between the scrollbar and the data-line for associating the slider to the data-line.

2. A computer system as claimed in claim 1, further comprising a separator presented in the display area between a first group of elements of information and a second group of elements of information.

3. A computer system as claimed in claim 1, further comprising:
    a first arrow button located at the first end of the scrollbar; and
    a second arrow button located at the second end of the scrollbar.

4. A computer system as claimed in claim 1, wherein the slider is configured to be moved by a cursor device.

5. A computer system as claimed in claim 1, wherein the data-line is configured to indicate chunks of data.

6. A computer system as claimed in claim 5, wherein the data-line is configured to display, separate from the display area, a pop-up display associated with a chunk of data.

7. A computer system as claimed in claim 6, wherein the pop-up display includes information regarding data in the chunk of data.

8. A computer system as claimed in claim 1, wherein the data-line is arranged temporally.

9. A computer system as claimed in claim 1, wherein the data-line is arranged alphabetically.

10. A computer system as claimed in claim 1, wherein the display area is rectangularly-shaped and has a vertical edge and a horizontal edge.

11. A computer system as claimed in claim 1, wherein the scrollbar is positioned adjacent next to one of the group consisting of the vertical edge and the horizontal edge.

12. A method of organizing data in a graphical user interface, the method comprising:
    providing a display window with a perimeter in the graphical user interface;
    displaying a set of data in a display area of the display window, the set of data having zero or more elements;
    providing a scrollbar along the perimeter of the display window, the scrollbar having a first end and a second end;
    associating a slider with the scrollbar and configuring the slider such that movement of the slider causes information in the display area to be scrolled;
    positioning a data-line parallel to the scrollbar, the data-line having a plurality of tick marks; and
    positioning a movable graphical element to extend between the scrollbar and the data-line for associating the slider to the data-line.

13. A method as claimed in claim 12, further comprising providing a separator in the display area between a first group of elements of information and a second group of elements of information.

14. A method as claimed in claim 12, further comprising:
    providing a first arrow button located at the first end of the scrollbar; and
    providing a second arrow button located at the second end of the scrollbar.

15. A method as claimed in claim 12, further comprising configuring the slider to be moved by a cursor device.

16. A method as claimed in claim 12, further comprising configuring the data-line to indicate chunks of data.

17. A method as claimed in claim 16, further comprising configuring the data-line to display a pop-up display, separate from the display area, associated with a chunk of data.

18. A method as claimed in claim 17, further comprising configuring the pop-up display to include information regarding data in the chunk of data.

19. A method as claimed in claim 12, further comprising configuring the data-line so that it is arranged temporally.

20. A method as claimed in claim 12, further comprising configuring the data-line so that it is arranged alphabetically.

21. A method as claimed in claim 12, further comprising arranging the display area so that it is rectangularly-shaped.

22. A method as claimed in claim 12, further comprising configuring the scrollbar to have a first and second end and positioning the slider between the first and second ends.

23. A method as claimed in claim 12, further comprising sizing the slider based on the size of the one or more elements of information.

24. A method as claimed in claim 12, further comprising associating the slider to the data-line with a graphical element.

25. A computer system having a display device and a control device, a graphical user interface for browsing a set of data displayed to a user, comprising:
- a display window display on the display device having a display area where one or more elements representing the set of data is displayed;
- a scrollbar positioned next to the display window;
- a slider associated with the scrollbar and configured such that movement of the slider causes data in the display area to be scrolled;
- a data-line positioned parallel to the scrollbar, the data-line having a plurality indicia that define chunks of data; and
- a marker extending between the scrollbar and the data-line for associating the slider to the data-line.

26. A computer system as claimed in claim 25, further comprising a separator presented in the display area between a first group of elements of information and a second group of elements of information.

27. A computer system as claimed in claim 26, wherein the display window includes a separator configured to be anchored at a point in the display area.

28. A computer system as claimed in claim 25, wherein the data-line includes a plurality of tick marks.

29. A computer system as claimed in claim 25, further comprising:
- a first arrow button located at the first end of the scrollbar; and
- a second arrow button located at the second end of the scrollbar.

30. A computer system as claimed in claim 25, wherein the slider is configured to be moved by a cursor device.

31. A computer system as claimed in claim 25, wherein the data-line is configured to display a pop-up display, separate from the display area, associated with at least one of the chunks of data.

32. A computer system as claimed in claim 25, wherein the data-line is arranged temporally.

33. A computer system as claimed in claim 25, wherein the data-line is arranged alphabetically.

* * * * *